Nov. 1, 1960 J. H. CLARK 2,958,831

EQUALIZER

Filed Dec. 17, 1956

INVENTOR
J. H. CLARK
BY
Ralph P. Holcomb
ATTORNEY

United States Patent Office 2,958,831

Patented Nov. 1, 1960

2,958,831

EQUALIZER

Jean H. Clark, Covina, Calif., assignor to American Telephone and Telegraph Company, a corporation of New York Filed Dec. 17, 1956, Ser. No. 628,661

1 Claim. (Cl. 333—28)

This invention relates to wave transmission networks and more particularly to a distortion corrector or equalizer.

A color television signal comprises a luminance signal, which controls the intensity or brightness, and a color carrier signal, the amplitude of which represents the saturation or purity of the color. Any change in the amplitude of this color carrier due to a variation in the amplitude of the luminance signal, called differential gain, causes a distortion of the color saturation.

In either a monochrome or a color television system, the luminance signal may be distorted by the non-linear characteristics of the equipment employed in generating, transmitting, and receiving it, and in converting it from electrical to optical energy or vice versa. This distortion usually consists of a compression or an expansion of the positive or the negative electrical excursions of the signal which, in this country, are respectively identified with the light and dark portions of the picture. Such distortion is known as grey scale distortion when it occurs in a monochrome system and luminance or saturation distortion when found in color television signals.

The distortion discussed above, when referred to the electrical transmission path, may consist of compression of both the white portion and the black portion of the signal, expansion of both portions, or compression of one and expansion of the other. The synchronizing pulse used in television transmission is in the region "blacker than black" and the percentage of this pulse is a sensitive indicator of compression or expansion in this region.

A similar type of distortion of the electrical wave shape may be caused by a nonlinear element in an electrical transmission path or by a nonlinear transducer. Examples are distortion in modulation or demodulation processes, loud speakers, electron-tube or transistor amplifiers, microphones, electrical transformers, and other devices.

For example, a single-ended electron-tube amplifier usually produces even-harmonic distortion, predominantly of the second-harmonic type, which consists of an expansion of one polarity of the wave form and a compression of the other. This can be compensated or corrected by an equal and opposite distortion, restoring the original wave shape, provided that the correction or equalization is applied either just before or just after the source of distortion in the transmission path, or failing this, delay equalization is provided so that, on a long circuit, the travel times of the fundamental wave and its significant harmonics are substantially equal. If there are no substantial differences in the speed of propagation or the transmission time between the fundamental frequency and its significant harmonics, delay equalization is not required, regardless of the physical distance.

Distortion of a similar character is also experienced in telephotograph and facsimile transmission.

The object of the present invention is to correct or compensate any of the types of distortion mentioned above.

The equalizer compensates the distortion by introducing an equal and opposite distortion or correction. It is ordinarily associated with the electrical portion of the signal path, and provides correction for that part of the system. It is evident, however, that the equalizer may be designed to compensate also for nonlinear optical-to-electrical or electrical-to-optical conversion. The compensation may be applied either before or after the source of the distortion, and several distortions may be corrected by one or more equalizers so that all sections of the transmission path can be made linear.

The principle underlying the operation of the equalizer will now be considered. First, two component signals are derived from the distorted input signal to be corrected. These signals are unequal in magnitude and are either in phase or 180 degrees out of phase with each other. The inequality in magnitude may be produced by amplifying or attenuating one signal, or by amplifying one and attenuating the other. One of these component signals is subjected to a differential treatment and then the two signals are recombined. This differential treatment may be provided by shunting one of the signal paths by one or more controllable, nonlinear impedance devices, or by mixing the two signals through one or more such devices. These devices are responsive to the substantially instantaneous current or voltage in the circuit. Thus, the amplitude of the smaller signal is affected by the amount of the larger signal which is allowed to pass through the nonlinear device, and the output signal becomes a function of the substantially instantaneous voltage or current applied to the equalizer. Means are provided for adjusting the shape of the current-versus-voltage characteristic of the nonlinear device, and also for providing different responses for different polarities of the applied voltage or current. A plurality of nonlinear devices may be employed to provide simultaneously available correction for different polarities of the signal and for different curve shapes. Also, biasing currents or voltages may be used to assist in obtaining the proper curve shapes to correct various distortions.

Four embodiments of equalizers in accordance with the present invention are disclosed herein, by way of example only. One is for use with a balanced circuit and the others with unbalanced circuits. Each equalizer comprises two transmisison paths connected in parallel at their input ends and means associated with one of the paths for changing the amplitude of the signal transmitted therethrough. These means may include an amplifier, an attenuator, or both. One or more nonlinear impedance devices are connected in one of the paths. Means are also included for adjusting the current-voltage characteristics of the nonlinear devices, means for adjusting the relative output voltages of the paths, and means for combining these voltages. When an amplifier is employed, a phase-shifting network may be included, if required, to compensate for the phase shift in the amplifier.

The nature of the invention and its various objects, features, and advantages will appear more fully in the following detailed description of the typical embodiments illustrated in the accompanying drawing, of which Fig. 1 is a schematic circuit of a balanced equalizer in accordance with the invention;

Figure 1:
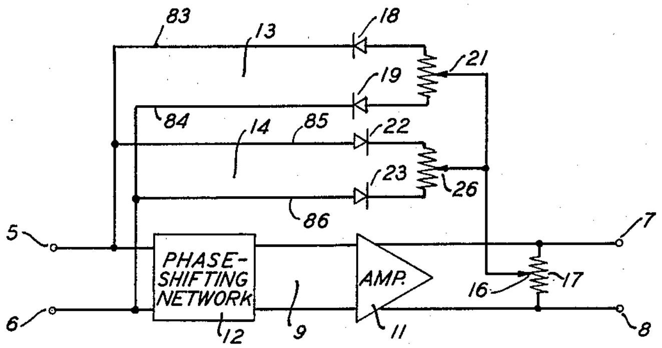

Taking up the figures in greater detail, the balanced equalizer of Fig. 1 comprises a signal transmission path 9 connected between a pair of input terminals 5, 6 and a pair of output terminals 7, 8. The path 9 includes an amplifier 11 and a phase-shifting network 12 connected in tandem. The network 12 is provided to compensate for any phase distortion in the amplifier 11 over the frequency range of interest. In some cases, it may be omitted. The combined phase shift of the amplifier 11 and the network 12 is either zero or 180 degrees at a selected operating frequency *f* of the equalizer. This frequency may, for example, coincide with that of the color carrier, if the equalizer is to be used with a color television system.

The branches 83 and 84 form part of a second transmission path 13. The paths 9 and 13 are connected in parallel at their input ends. The branches 83 and 84 are connected at their output ends through a resistor or voltage divider having an adjustable tapping point 21 which is connected to the adjustable tapping point 16 on a voltage divider 17 shunted across the output end of the path 9. The branches 83 and 84 include, respectively, the nonlinear impedance devices 18 and 19.

The branches 85 and 86 constitute part of a third transmission path 14 also connected in parallel with the path 9 at their input ends. The output ends of the branches 85 and 86 are connected through a voltage divider having an adjustable tapping point 26 also connected to the point 16. The nonlinear impedance devices 22 and 23 are connected, respectively, in the branches 85 and 86.

The devices 18, 19, 22, and 23 may, for example, be crystal-diode, copper-oxide, selenium, or electron-tube rectifiers, neon or similar-type gas tubes, or nonlinear resistors, capacitors or inductors. They are shown as rectifiers. Each of these devices may be replaced by two or more nonlinear devices, and biasing currents or voltages or additional series or shunt resistors may be employed as an aid in providing the required characteristic to correct the distortion of the input signal.

If the points 16, 21, and 26 are centrally positioned, the equalizer introduces no correction. The path 13 provides correction on the positive excursion of the output signal. Moving the point 21 adjusts the correction between expansion and compression. The path 14 provides correction on the negative excursion of the output signal, and the setting of the point 26 determines the distribution between expansion and compression.

The setting of the point 16 and the choice of the gain furnished by the amplifier 11 determine the magnitude or range of the correction. The gain of the amplifier 11 may be made adjustable and may be so set that there is no overall loss, or that there is even a gain, in the equalizer.

If only expansion of the signal is required, two of the nonlinear devices, for example 19 and 23, may be omitted. If compression only is required, the nonlinear devices 18 and 22 may be omitted.

Figure 2:
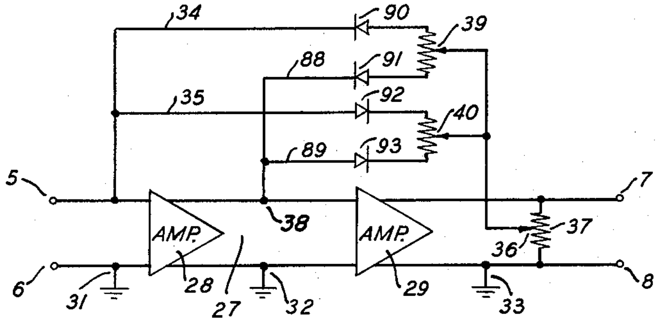
Fig. 2 shows schematically an unbalanced equalizer employing two amplifiers in the signal path.

Fig. 2 shows an unbalanced equalizer in accordance with the invention employing two tandem-connected amplifiers 28 and 29 in the transmission path 27 between the input terminals 5, 6 and the output terminals 7, 8. One side is grounded as shown at the points 31, 32, and 33. Each of the amplifiers 28 and 29 has a phase shift of 180 degrees at the frequency *f*. The branches 34 and 35 are connected at their input ends to high-side input terminal 5. The input ends of the branches 88 and 89 are connected to a point 38 between the amplifiers 28 and 29. The branches 34 and 88 are connected at their output ends through a voltage divider having an adjustable tapping point 39. The output ends of the branches 35 and 89 are connected through a voltage divider having an adjustable tapping point 40. The points 39 and 40 are connected to an adjustable tapping point 36 on a voltage divider 37 shunted across the output terminals 7 and 8. Thus, the branches 34 and 35 bridge both of the amplifiers 28 and 29 while the branches 88 and 89 bridge only the second amplifier 29. The nonlinear impedance devices 90, 91, 92, and 93, shown as rectifiers, are connected, respectively, in the paths 34, 88, 35, and 89.

When the tapping points 36, 39, and 40 are centrally positioned, the equalizer introduces no correction. The rectifiers 90 and 91 provide correction on the positive excursion of the input signal, and 92 and 93 on the negative excursion. The rectifiers 90 and 92 provide expansion of the signal, and 91 and 93 provide compression. The settings of the points 39 and 40 determine the distribution of the correction characteristics as between expansion and compression. The setting of the point 36 and the gains of the amplifiers 28 and 29 determine the magnitudes of the corrections.

Figure 3:
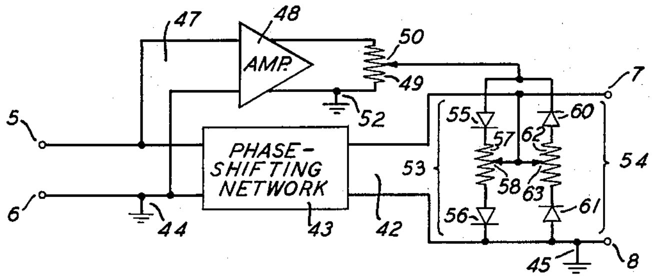
Fig. 3 shows an unbalanced equalizer employing an amplifier in the control path and a phase-shifting network in the signal path.

Fig. 3 shows an unbalanced equalizer with a single amplifier, located in the control path. The transmission path 42 between the input terminals 5, 6 and the output terminals 7, 8 includes a phase-shifting network 43 and is grounded at the points 44 and 45. A second transmission path 47, connected in parallel with the path 42 at their input ends, includes an amplifier 48, terminated in a voltage divider 49 having an adjustable tapping point 50. One side of the path 47 is grounded, as shown at the point 52.

The parallel combination of the two branches 53 and 54 is connected in series with the path 47. The branch 53 includes the series combination of two nonlinear impedance devices 55 and 56 and an interposed resistor 57 with an adjustable tapping point 58. Similarly, the branch 54 comprises the nonlinear impedance devices 60 and 61 and the resistor 62 with tapping point 63. The nonlinear devices are represented as rectifiers. The rectifiers are poled in one direction in the branch 53 and in the opposite direction in the branch 54. The input ends of the branches 53 and 54 are connected to the tapping point 50 and their output ends are connected to the grounded output terminal 8 of the equalizer. The tapping points 58 and 63 are connected to the output terminal 7. The magnitude of the correction is determined by the setting of the point 50 and the gain of the amplifier 48. The division of the correction between the positive excursion and the negative excursion depends upon the positions of the tapping points 58 and 63.

The network 43 has a phase shift chosen to compensate the phase shift in the amplifier 48 at the frequency *f*. Thus, the equalizer furnishes only gain correction. Under some circumstances, however, the network 43 may be omitted.

Figure 4:
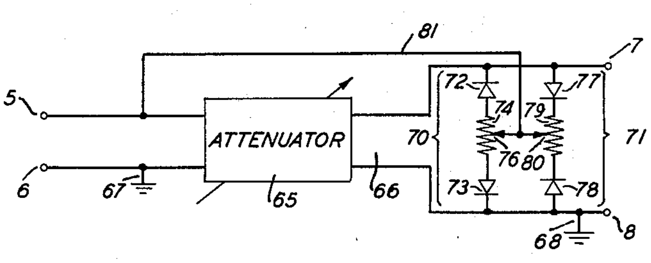
Fig. 4 shows an unbalanced equalizer using an attenuator.

Fig. 4 shows an unbalanced equalizer which requires no internal amplifier, although one may be connected in tandem therewith, if desired. An attenuator 65 is included in the transmission path 66 between the input terminals 5, 6 and the output terminals 7, 8. One side is grounded, as shown at the points 67 and 68. Two impedance branches 70 and 71 are connected in shunt at the output end of the path 66. The branch 70 includes the series combination of two nonlinear impedance devices 72 and 73 and an interposed resistor 74 with an adjustable tapping point 76. Similarly, the branch 71 comprises the nonlinear impedance devices 77 and 78 and the resistor 79 with tapping point 80. The devices 72, 73, 77, and 78 are shown as rectifiers. The rectifiers in the branch 70 are oppositely disposed and those in the branch 71 are also oppositely disposed, but in one branch the anodes face each other and in the other branch the cathodes face each other. A conductor 81 connects the input terminal 5 to the tapping points 76 and 80, and thus provides a second transmission path.

The attenuator 65 is preferably made adjustable, either continuously or in steps, so that the output voltage of the path 66 may be adjusted to provide the required curve shape to compensate the distortion. The setting of the tapping point 76 determines the correction on the positive excursion of the signal and the position of the point 80 controls the correction on the negative excursion.

In all of the above arrangements, direct current return paths for the pulsating rectified currents produced by the rectifiers are assumed to exist through the phase networks, amplifier inputs, attenuators or the terminal devices to which the equalizer is connected. When in a particular case this may not be true, return paths can be provided by means of suitably disposed resistors.

It is to be understood that the above-described arrangements are only illustrative of the application of the principles of the invention. Numerous other arrangements may be devised by those skilled in the art without departing from the spirit and scope of the invention. For example, when the nature of the distortion is such that one or more of the nonlinear impedance devices are seldom or never needed in order to provide satisfactory equalization, they may be omitted since their inclusion would serve no useful purpose for that particular application. Also, it is evident that any of the equalizers disclosed may include an amplifier in one transmission path and an attenuator in a second, parallel, transmission path.

What is claimed is:

An equalizer adapted to compensate compression or expansion in both the positive and the negative excursions of an alternating-current signal comprising a first transmission path, means connected in tandem with the path for changing the amplitude of the signal, two branches shunted across the path on one side of said means, each of the branches including the series combination of two rectifiers and an interposed resistor, and a second transmission path from a point in the first path on the other side of said means to selected points on each of the resistors, the rectifiers being oppositely connected in each branch and differently connected in the two branches, the points being selected to provide the desired compression or expansion of the signal, the rectifiers in one of the branches having characteristics adapted to compensate distortion on the positive electrical excursion of the signal, and the rectifiers in the other branch having characteristics adapted to compensate distortion on the negative excursion of the signal.

References Cited in the file of this patent

UNITED STATES PATENTS

| | | |
|---|---|---|
| 2,233,061 | Peterson | Feb. 25, 1941 |
| 2,252,002 | Halsey | Aug. 12, 1941 |
| 2,293,628 | Reiling | Aug. 18, 1942 |
| 2,548,913 | Schreiner et al. | Jan. 17, 1951 |
| 2,760,164 | Graham et al. | Aug. 21, 1956 |
| 2,776,410 | Guanella | Jan. 21, 1957 |
| 2,849,546 | Martin | Aug. 26, 1958 |